(12) United States Patent
Whitby

(10) Patent No.: US 6,874,210 B1
(45) Date of Patent: Apr. 5, 2005

(54) CLIPPING DEVICE AND METHOD OF USE

(75) Inventor: Claude H. Whitby, Corpus Christi, TX (US)

(73) Assignee: Whitmar, Inc., Corpus Christi, TX (US)

( * ) Notice: Subject to any disclaimer, the term of this patent is extended or adjusted under 35 U.S.C. 154(b) by 247 days.

(21) Appl. No.: 10/110,666

(22) PCT Filed: Oct. 19, 2000

(86) PCT No.: PCT/US00/29152
§ 371 (c)(1),
(2), (4) Date: Apr. 15, 2002

(87) PCT Pub. No.: WO01/30191
PCT Pub. Date: May 3, 2001

Related U.S. Application Data
(60) Provisional application No. 60/161,056, filed on Oct. 25, 1999.

(51) Int. Cl.⁷ ............... A44B 13/02; A47G 25/14; D06F 57/00
(52) U.S. Cl. ............ 24/600.9; 24/265 H; 24/599.1; 24/599.2; 24/601.2; 24/602.5; 223/91
(58) Field of Search ............ 24/600.9, 601.2, 24/601.5, 599.1, 265 H, 599.2; 223/91

(56) References Cited

U.S. PATENT DOCUMENTS

| | | | |
|---|---|---|---|
| 40,790 A | * 12/1863 | Bornemann | ............ 24/598.8 |
| 63,478 A | 8/1867 | Cooper | |
| 96,417 A | 11/1869 | Fraser | |
| 750,373 A | 1/1904 | Kinnear | |
| 778,963 A | 1/1905 | Guffin | |
| 1,524,810 A | * 2/1925 | Bolen | ............ 223/91 |
| 1,563,660 A | 12/1925 | Rubin | |
| 1,767,897 A | 6/1930 | Roman et al. | |
| 1,910,629 A | 5/1933 | Navarte | |
| 1,973,376 A | 9/1934 | Freedman | |
| 2,072,017 A | 2/1937 | Wisneski | |
| 2,409,538 A | 10/1946 | Brill et al. | |
| 4,599,767 A | 7/1986 | Kasai | |
| 4,622,724 A | 11/1986 | Dupre | |
| 4,691,416 A | 9/1987 | Nakayama et al. | |
| 4,868,954 A | 9/1989 | Kasai | |
| 5,136,756 A | 8/1992 | Krauss | |
| 5,146,657 A | 9/1992 | Frano | |
| 5,161,287 A | 11/1992 | Picollet | |
| 5,253,396 A | 10/1993 | Rekuc et al. | |
| 5,450,661 A | 9/1995 | Rekuc | |
| 5,475,901 A | 12/1995 | Anscher | |
| 5,502,878 A | 4/1996 | Anscher | |
| 5,566,428 A | 10/1996 | Takahashi | |
| 5,624,094 A | 4/1997 | Protz, Jr. | |

* cited by examiner

*Primary Examiner*—Victor Sakran
(74) *Attorney, Agent, or Firm*—George S. Gray (57) ABSTRACT

A clipping device (2) and method of use wherein the clipping device (2) comprises a hook (4) for attachment to a supporting bar or other device. The hook (4) has a shank end (6) and a curved end (8). A two-way gate (10) having an upper end (12) and a lower end (14) is pivotally coupled to the shank end (6) of the hook (4). The upper end (12) of the two-way gate (10) is adjacent to the curved end (8) of the hook (4) and forms an openable mouth (16). A method for using the clipping device (2) comprises attaching the clipping device (2) to a support by pressing the upper end (12) of the two-way gate (10) against the support causing movement of the two-way gate (10) inward providing passage (16) for the support into said hook (4). The clipping device (2) is detached from the support by pressing the upper end (12) of the two-way gate (10) against the support, causing movement of the two-way gate (10) outward, providing passage (16) for the support out of the hook (4).

17 Claims, 8 Drawing Sheets

CLIPPING DEVICE AND METHOD OF USE

BACKGROUND ART

This Utility Patent Application claims priority to United States Provisional Application No. 60/161,056 filed on Oct. 25, 1999.

TECHNICAL FIELD

The invention relates to clips, hooks and hangers, and more particularly to curtain hooks and clothes hangers.

This invention relates to a novel clipping device that is capable of being easily, yet securely attached to a support bar. Other uses of this invention include attaching vehicle information to a vehicle that is for sale and hanging a shower curtain. In one embodiment, the clipping device includes a garment support member, thus creating a clothes hanger that is capable of being securely attached to a support bar. Clothes hangers known in the art do not have a means of being easily, yet securely attached to and disengaged from a support bar. When subjected to accidental bumping, shaking, pulling or like pressures, conventional clothes hangers easily become disengaged resulting in the hangers and clothing falling to the floor and becoming tangled. In situations where frequent movement occurs such as moving vans, motor homes, boats or the like, accidentally disengaged clothes hangers and clothing are a common problem. Further, clothes hangers used in residential closets also are exposed frequently to similar movements due to overcrowding. In these situations, the removal of one article of clothing or other item often results in the inadvertent removal of adjacent hangers. Likewise, even in an uncrowded closet, children and adults often remove clothing at such an angle that adjacent hangers and/or clothing also are disengaged inadvertently. The end result from each of these situations is a tangled mass of clothes hangers and wrinkled or soiled clothing.

For the reasons outlined above and for other reasons, the need exists to securely fasten a hanger to a support rod. The use of a removable clipping device, which is capable of securely holding a clothes hanger to a hanging rod in adverse conditions, would prevent accidentally disengaged clothes hangers and also allow people to easily attach and remove a clothes hanger from a hanging rod. The benefits of this invention are not limited to use of the clipping device with a clothes hanger, however. This invention may be used in any situation where it is necessary to secure an item to a support rod or other structure, yet still remove it with minimal effort. Indeed, the improved clipping device may be used in a variety of other applications such as attaching conventional curtains, shower curtains, or any other materials that are hung in the domestic household. The improved clipping device may also be used in commercial, agricultural, or industrial applications where the need exists to secure an item that will be removed in the future.

In view of the above-described deficiencies, the present invention has been developed to alleviate these drawbacks and to provide further benefits to the user. These enhancements and benefits are described in greater detail below, including several alternative embodiments of the present invention.

DISCLOSURE OF INVENTION

The present invention is directed to a new clipping device. The clipping device comprises a hook having a shank end and a curved end and a two-way gate having an upper end and a lower end. The lower end of the two-way gate is pivotally coupled to the shank end of the hook. The upper end of the two-way gate is adjacent to the curved end of the hook thereby forming an openable mouth. In one embodiment of the present invention, the two-way gate is tapered from the lower end toward the upper end.

In one embodiment of this invention, the clipping device further comprises a triangular garment support member. In alternative embodiments, the garment support member is adapted to support such articles of clothing such as sweaters, skirts, turtleneck shirts and/or at least one pair of pants. Another embodiment of this invention is directed toward the method of use of the clipping device.

It is an object of the present invention, by virtue of its features, to provide the user with a new clipping device, capable of being easily attached and removed from a support, thereby eliminating the clipping device accidentally coming off the support. By providing a secure clipping device, there is a minimal likelihood that the clipping device would become disengaged when the device is exposed to situations of accidental pulling, bumping, jarring or shaking. Still, other objects, features, and advantages of the present invention will be apparent from the following description of the preferred embodiments, given for the purpose of disclosure, and taken in conjunction with the accompanying drawings.

BRIEF DESCRIPTION OF DRAWINGS

FIG. 1.a. is a side view of the clipping device in which the two-way gate is swung inwardly.

FIG. 1.b. is a side view of the clipping device in which the two-way gate is swung outwardly.

BEST MODE FOR CARRYING OUT THE INVENTION

Figure 1:
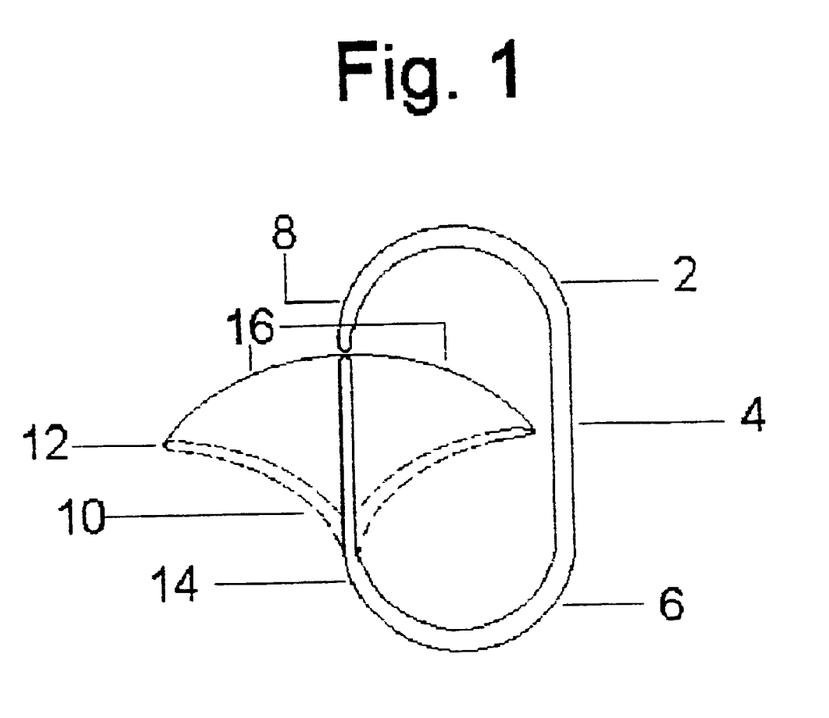
FIG. 1 is a side view of the clipping device in which the two-way gate is in a closed position.

Referring to the drawings, FIG. 1 shows a preferred embodiment of the present invention. FIG. 1 is a side view of the clipping device 2 in which the two-way gate 10 is in a closed position. The clipping device 2 comprises a hook 4 having a shank end 6 and a curved end 8 and a two-way gate 10 having an upper end 12 and a lower end 14. The lower end 14 of the two-way gate 10 is pivotally coupled to the shank end 6 of the hook 4. The upper end 12 of the two-way gate 10 is adjacent to the curved end 8 of the hook 4 thereby forming an openable mouth 16. In one embodiment of the present invention and as illustrated in FIG. 1, the two-way gate 10 is tapered from the lower end 14 toward the upper end 12. The two-way gate 10 may be a separate piece that is pivotally coupled to the shank end 6 of the hook 4. Preferably, however, the gate 10 is merely an extension of the same material from which the clipping device 2 is formed.

Figure 1A:
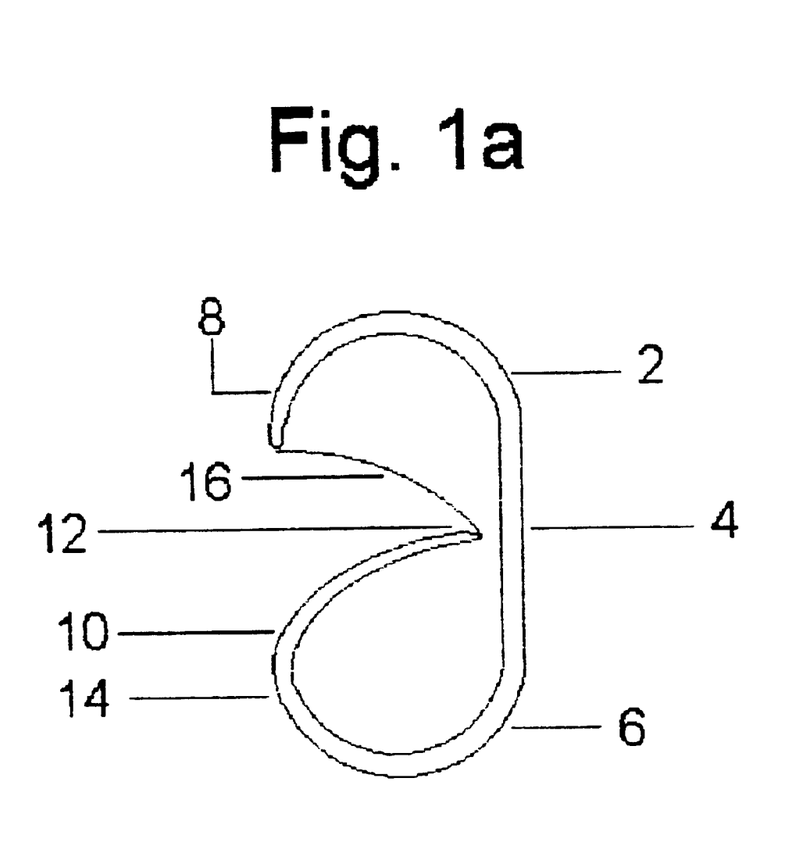
Figure 1B:
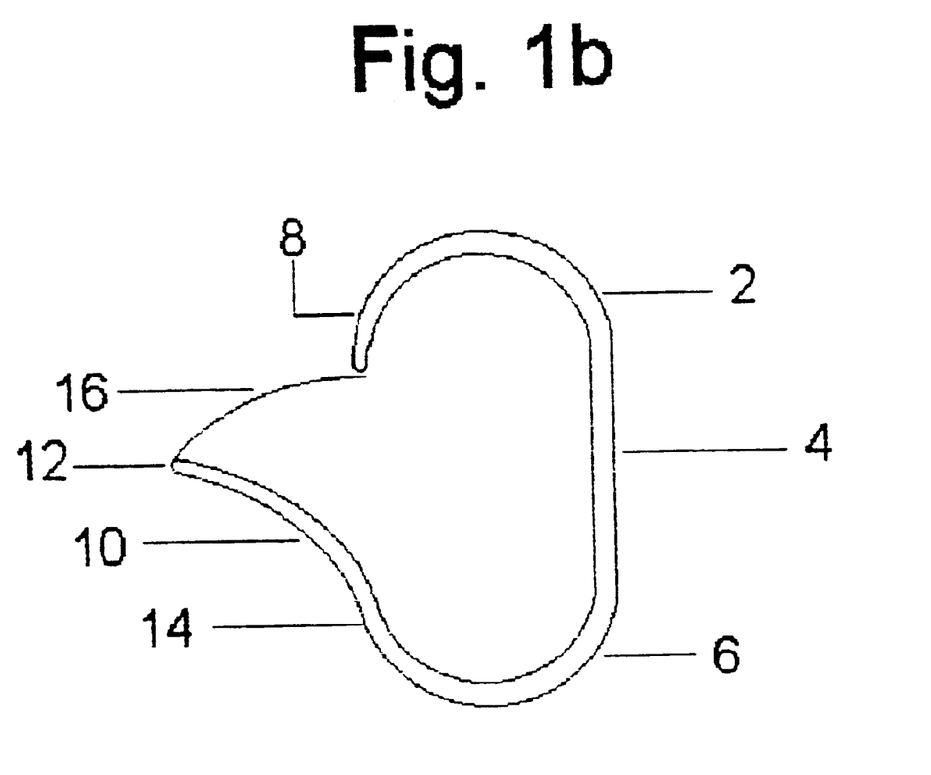

By applying pressure to the upper end 12 of the two-way gate 10, the two-way gate 10 will open inward at the openable mouth 16, as depicted in FIG. 1.a., thereby allowing the hook 4 to engage a supporting rod or other item (not shown). In at least one embodiment, the entire clipping device 2 is made of the same material as the two-way gate 10. The two-way gate 10 is made of a material that recoils or has memory quality that returns the two-way gate 10 to a closed position (as shown in FIG. 1) after the pressure force is removed from the upper end 12. Similarly, by applying reverse pressure to the upper end 12 of the two-way gate 10, the two-way gate 10 pivots outwards, as depicted in FIG. 1.b., to allow the hook 4 to become disengaged from a supporting rod. The arrows of FIG. 1, indicate the possible positions of the upper end 12 of the two-way gate 10 in the inward and outward positions.

Figure 2:
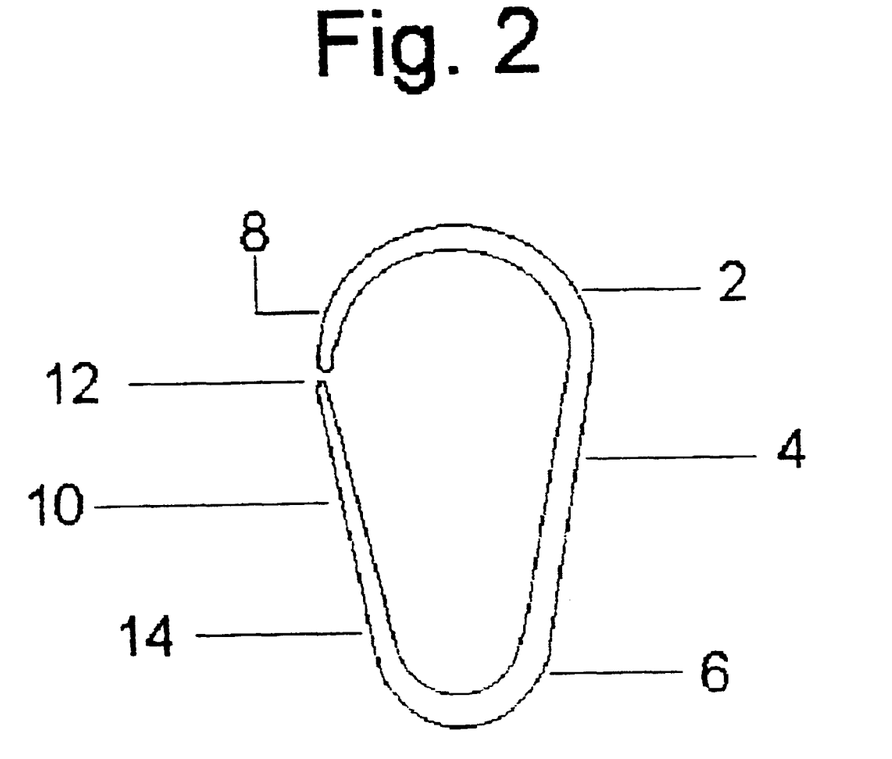
FIG. 2 is a side view of an alternate configuration of the clipping device.

FIG. 2 depicts an alternate configuration of the clipping device 2. It should be appreciated that the clipping device 2 may be constructed in various sizes, shapes, and configurations.

Figure 3:
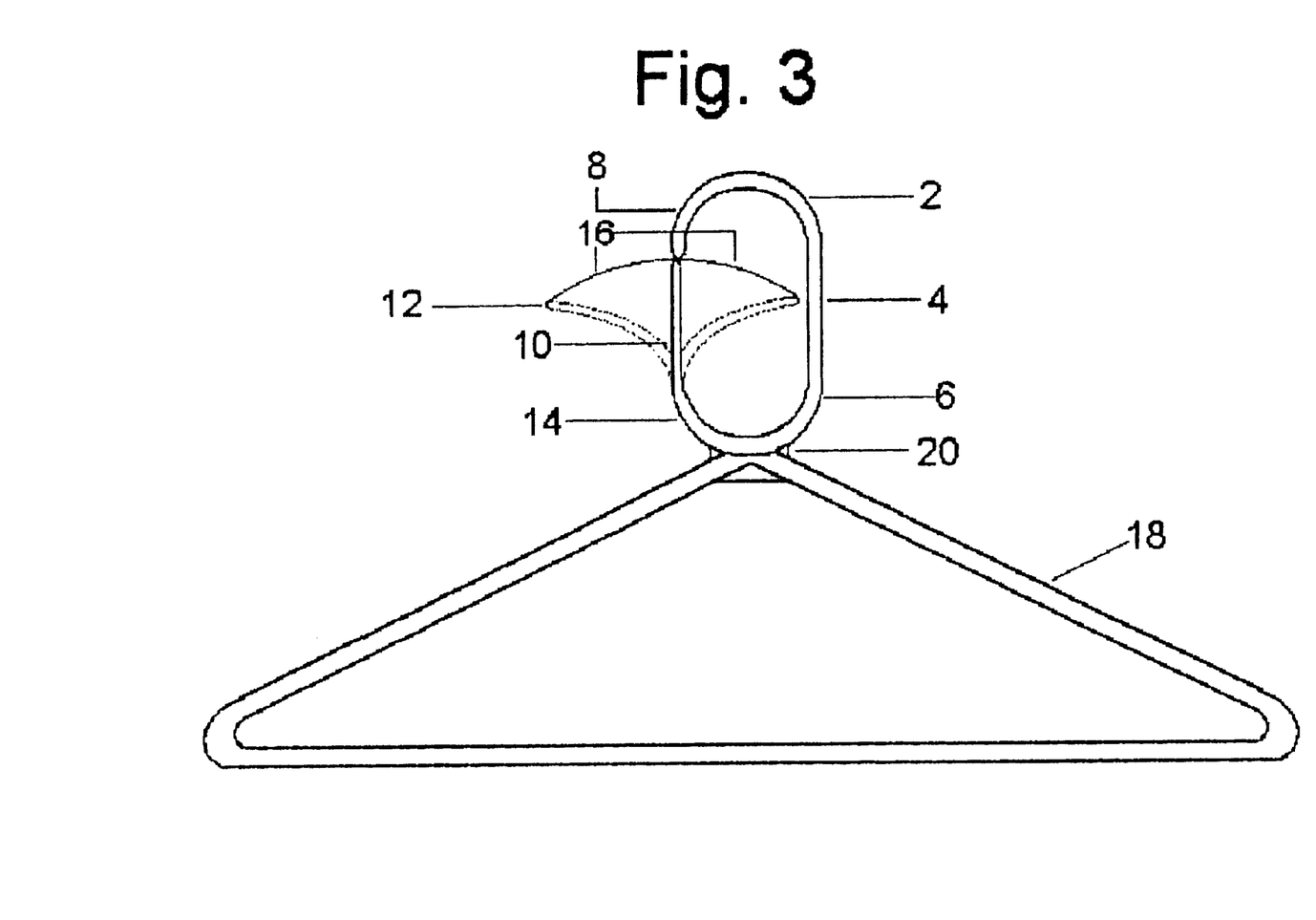
FIG. 3 is a side view of the clipping device connected to a triangular garment support member.

In one embodiment of this invention, as depicted in FIG. 3, the clipping device 2 further comprises a triangular garment support member 18. In this embodiment, the clipping device is preferably constructed with the dimensions of a standard clothes hanger hook, well known by those skilled in the art. In one variation of this embodiment, the clipping device 2 and triangular support member 18 are integral. It will be appreciated that the clipping device 2, and particularly the hook 4 may be made to any size necessary. For example, the clipping device 2 may be configured with a small hook 4 to allow for a secure attachment to support rods of a smaller diameter or to accommodate unusual support rod configurations. Other embodiments, moreover, may be constructed such that the garment support 18 is a smaller size or otherwise adapted for use with children's clothing. For example, larger embodiments may be constructed for industrial applications wherein an easily attachable and easily detachable clip is desired.

The clipping device 2 may also be constructed using the dimensions of a standard curtain hanger. In another embodiment, the clipping device will be constructed using dimensions of a standard shower curtain hanger. In both embodiments, the upper end 12 of the two-way gate 10 is inserted through the eyelets at the top of the curtain (not shown) to securely hold the curtain to the curtain rod (not shown).

Figure 4:
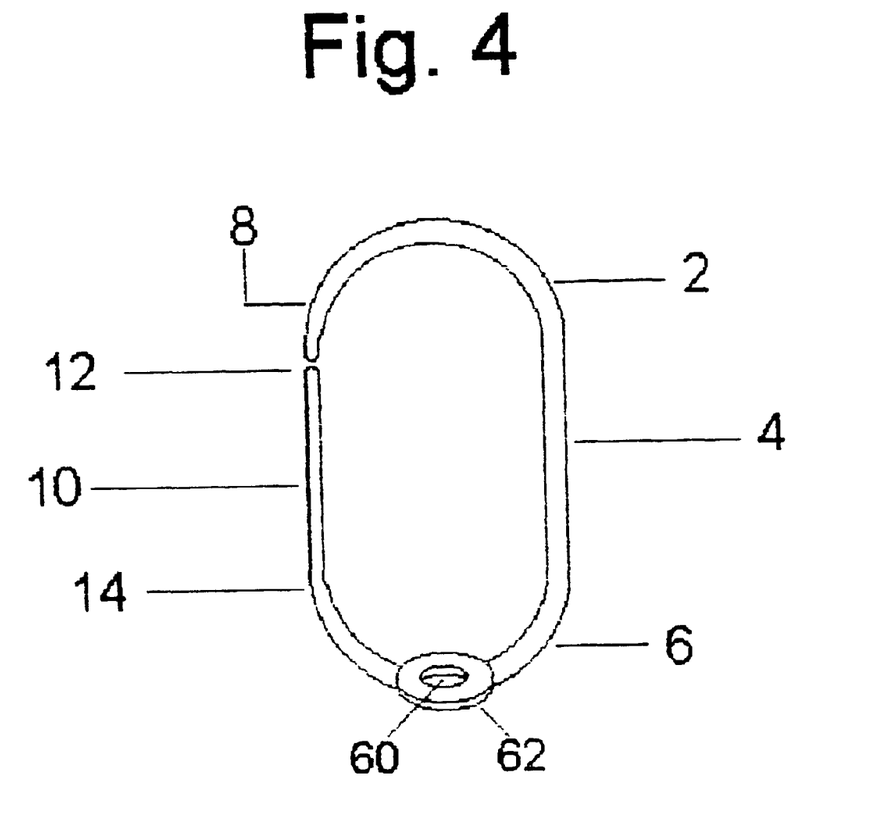
FIG. 4 is a side view of an embodiment of the clipping device with an attachment aperture.
Figure 5:
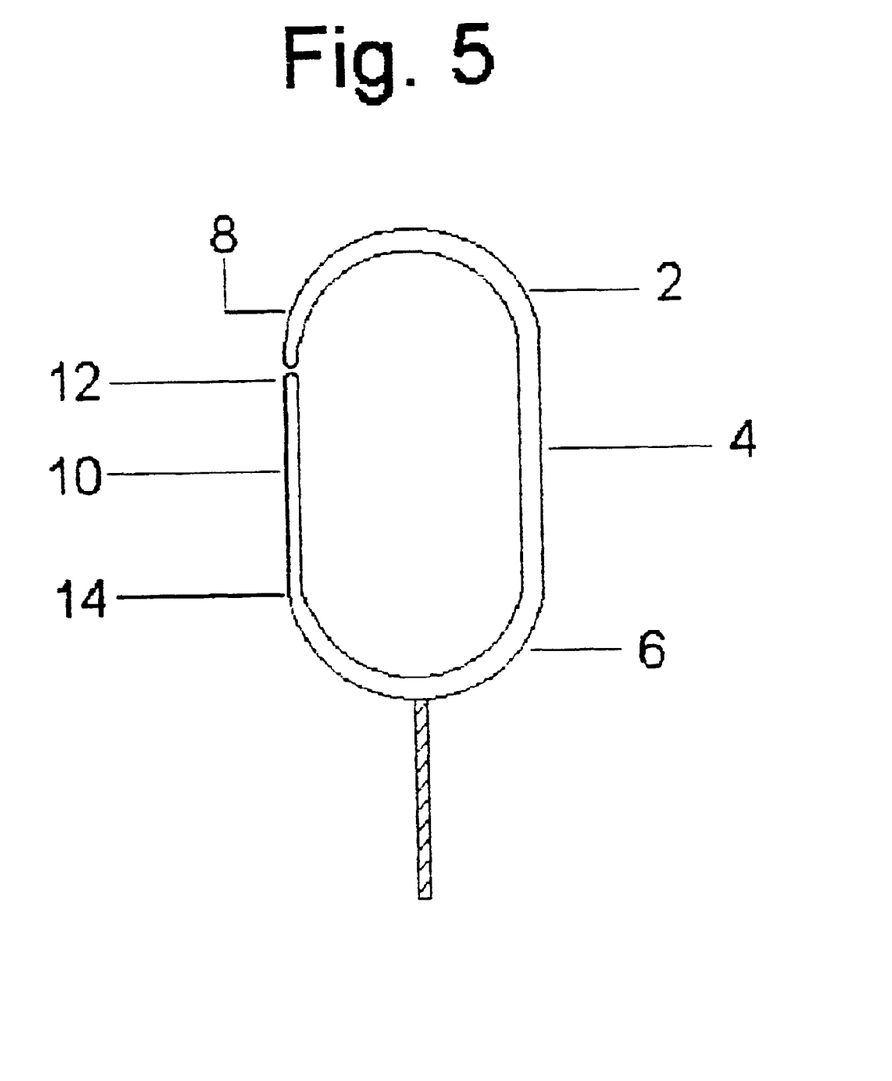
FIG. 5 is a side view of an embodiment of the clipping device with an attachment dowel.
Figure 6:
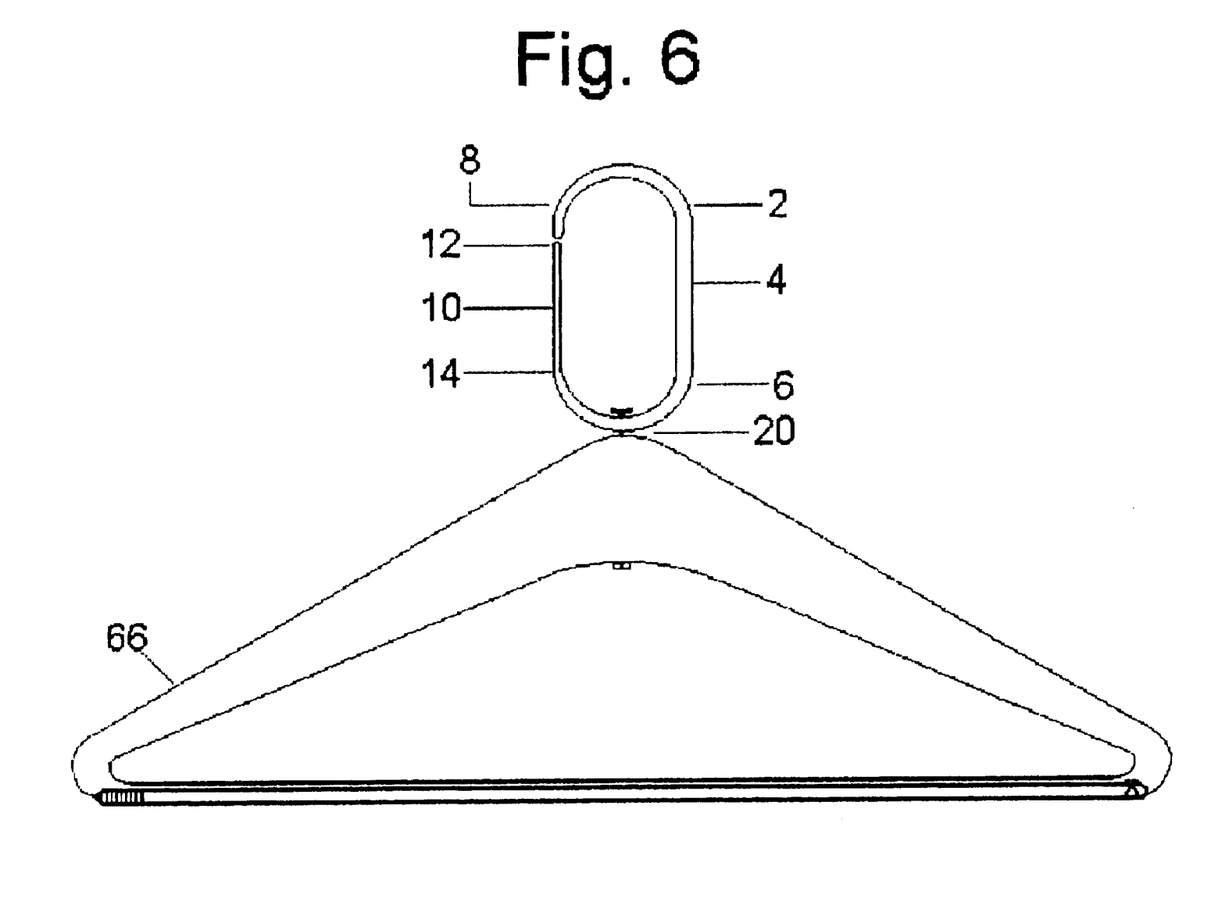
FIG. 6 is a side view of the clipping device attached to a wooden hanger.

In an alternative embodiment, the clipping device 2 includes an attachment means 60 located at the shank end 6 for attaching the clip 2 to various objects. In one embodiment, as depicted in FIG. 4, the attachment means 60 comprises an aperture 62 located in the shank end 6 of the clipping device 2. The aperture 62 allows the clipping device 2 to be attached to virtually any number of objects or devices by means of screws or other methods of attachment as are well known in the art. In another embodiment, as depicted in FIG. 5, the attachment means 60 consists of a dowel or screw 64. As is well known in the art, the dowel or screw 64 can be used to attach the clipping device 2 to a variety of devices or objects. FIG. 6 depicts the clipping device 2 attached to a conventional wooden hanger 66, preferably at its apex 18. As can be appreciated, the clipping device 2 can be attached to the wooden hanger 66, either directly by means of the embodiment with the dowel or screw 64 of the embodiment depicted in FIG. 4, or by a separate bolt or screw attached through the aperture 62 of the embodiment depicted in FIG. 5.

The clipping device 2 may be made of any material that can be formed into a hook shape and exhibits the elastic characteristics necessary to operate the pivotal two-way gate 10. These materials include wood, steel, metal or alloys or composite materials, polymers, resins, rubber compounds, and other plastics, and in the preferred embodiment the material is polypropylene, polyethylene or polyurethane. In the most preferred embodiment, the clipping device 2 is made from polypropylene. The manufacturing methods for making the clipping device 2 depend upon the materials used to construct it and are well known to those skilled in the art. Methods of manufacturing the preferred embodiment of the clipping device 2 from plastics or polymers include injection molding, pour molding, blow molding, rotational molding, press molding or stamping, and are well known to those skilled in the art. Methods of manufacturing the clipping device 2 from flexible steel or other metals include stamping, extruding, or molding, and are also well known in the art.

The preferred method of the present invention is a method of securing the clipping device 2 to a support comprising providing a hook 4 having a shank end 6, a curved end 8, and a two-way gate 10. The gate 10 has an upper end 12 and a lower end 14 pivotally coupled to the shank end 6 of the hook 4. The upper end 12 of the gate 10 is adjacent to the curved end 8 and forms an openable mouth 16. Further details about the device 2 are provided above.

The method further involves securing a clipping device 2 to a support by pressing said upper end 12 of said two-way gate 10 against a support, which causes movement of said two-way gate 10 inward, thereby opening said openable mouth 16 and providing passage for said support into said hook 4. In one embodiment of the invention, the method further comprises removing said clipping device 2 from said support by pressing said upper end 12 of said two-way gate 10 against said support, thereby causing movement of said two-way gate 10 outward, and opening said openable mouth 16 and providing passage for said support out of said hook 4.

Common elements such as hanger configurations and the like are not shown or described except when necessary for the understanding of the invention, since for the most part, selection and placement of such features is well within the skill of the ordinary engineer. Although the above method and apparatus are described in terms of the above preferred embodiments, those skilled in the art will recognize that changes in the process and apparatus may be made without departing from the spirit of the invention. Such changes are intended to fall within the scope of the following claims.

Industrial Applicability

The present invention will find use in household applications as well as in medical, industrial, and agricultural applications.

I claim:

1. A securely attachable clothing hanger comprising:

a triangular garment support member having an apex;

a hook attached to said triangular garment support member at said apex;

said hook being a continuous single piece, the hook comprising a shank end and a curved end, and a flexible two-way gate having an upper end and a lower end, the lower end extending from said shank end, wherein said gate upper end is adjacent said curved end thereby forming an openable mouth, and further wherein the gate is unobstructed by the hook as it pivots in both an inward direction toward the shank, and an outward direction away from the shank.

2. A securely attachable clothing hanger comprising:

a triangular garment support member having an apex;

a continuous single piece hook comprising a shank end and a curved end, and a flexible two-way gate having an upper end and a lower end, the lower end extending from said shank end, wherein said gate upper end is adjacent said curved end thereby forming an openable mouth, and further wherein the gate is unobstructed by the hook as it pivots in both an inward direction toward the shank, and an outward direction away from the shank; and an attachment mechanism for removably joining the hook to the support member apex.

3. The hanger of claim 2, wherein the hook further comprises an aperture, the attachment mechanism comprising a protrusion on the support member protruding through the aperture and affixing the hook to the support member.

4. The hanger of claim 3, wherein the protrusion is a threaded member and the aperture is threadably coupled to the threaded member.

5. The hanger of claim 3, wherein the protrusion is a dowel and the aperture is adapted to fixedly receive the dowel.

6. The hanger of claim 2, wherein the support member further comprises an aperture, the attachment mechanism comprising a protrusion on the hook protruding through the aperture and affixing the hook to the support member.

7. The hanger of claim 2, wherein the protrusion is a threaded member and the aperture is threadably coupled to the threaded member.

8. The hanger of claim 2, wherein the protrusion is a dowel and the aperture is adapted to fixedly receive the dowel.

9. A hanger for supporting an object on a hanging structure comprising:

a support member upon which the object is placed;

a hook assembly, the hook assembly having:

a continuous single piece hook having a free end, the hook forming a mouth;

a gate member, resiliently deformable in all directions, the gate member having a free end, the resilient gate member being positioned with respect to the hook such that the gate member free end is proximate the hook free end, and further positioned such that the mouth is substantially obstructed when the gate member is not deformed, and open to accept the hanging structure when the gate member is deformed, the gate member being further positioned such that the hook free end does not obstruct the gate member as the gate member is deformed; and an attachment mechanism for removably attaching the hook assembly to the support member.

10. The hanger of claim 9, wherein the hook assembly further comprises an aperture, the attachment mechanism comprising a protrusion on the support member protruding through the aperture and affixing the hook assembly to the support member.

11. The hanger of claim 10, wherein the protrusion is a threaded member and the aperture is threadably coupled to the threaded member.

12. The hanger of claim 10, wherein the protrusion is a dowel and the aperture is adapted to fixedly receive the dowel.

13. The hanger of claim 9, wherein the support member further comprises an aperture, the attachment mechanism comprising a protrusion on the hook assembly protruding through the aperture and affixing the hook assembly to the support member.

14. The hanger of claim 13, wherein the protrusion is a threaded member and the aperture is threadably coupled to the threaded member.

15. The hanger of claim 13, wherein the protrusion is a dowel and the aperture is adapted to fixedly receive the dowel.

16. A hanger for supporting an object on a hanging structure comprising:

a support member upon which the object is placed;

a hook assembly attached to the support member, the hook assembly having:

a continuous single piece hook having a free end, the hook forming a mouth;

a gate member, resiliently deformably inwardly and outwardly, the gate member having a free end, the resilient gate member being positioned with respect to the hook such that the gate member free end is proximate the hook free end, and further positioned such that the mouth is substantially obstructed when the gate member is not deformed, and open to accept the hanging structure when the gate member is deformed inwardly, the gate member being further positioned such that the hook free end does not obstruct the gate member as the gate member is deformed outwardly.

17. A hanger for supporting an object on a hanging structure comprising:

a support member upon which the object is placed;

a hook assembly attached to the support member, the hook assembly having:

a hook having a free end, the hook forming a mouth;

a continuous single piece gate member, resiliently deformable in all directions, the gate member having a free end, the resilient gate member being positioned with respect to the hook such that the gate member free end is proximate the hook free end, and further positioned such that the mouth is substantially obstructed when the gate member is not deformed, and open to accept the hanging structure when the gate member is deformed, the gate member being further positioned such that the hook free end does not obstruct the gate member as the gate member is deformed in any direction.

\* \* \* \* \*